United States Patent Office 3,454,105
Patented July 8, 1969

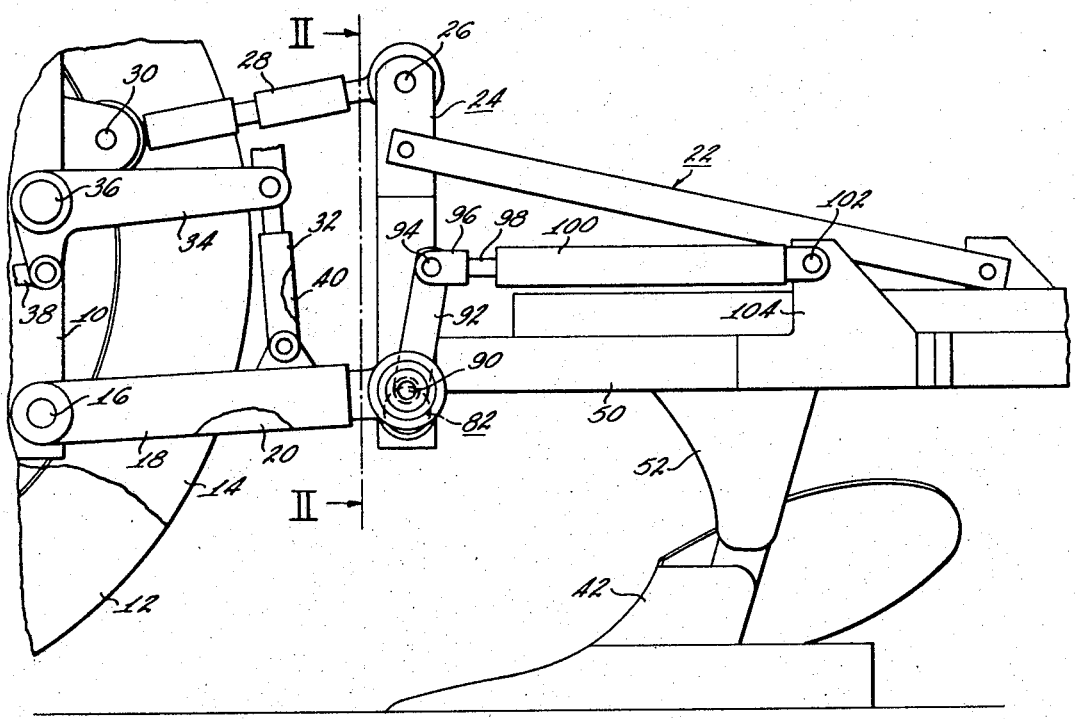

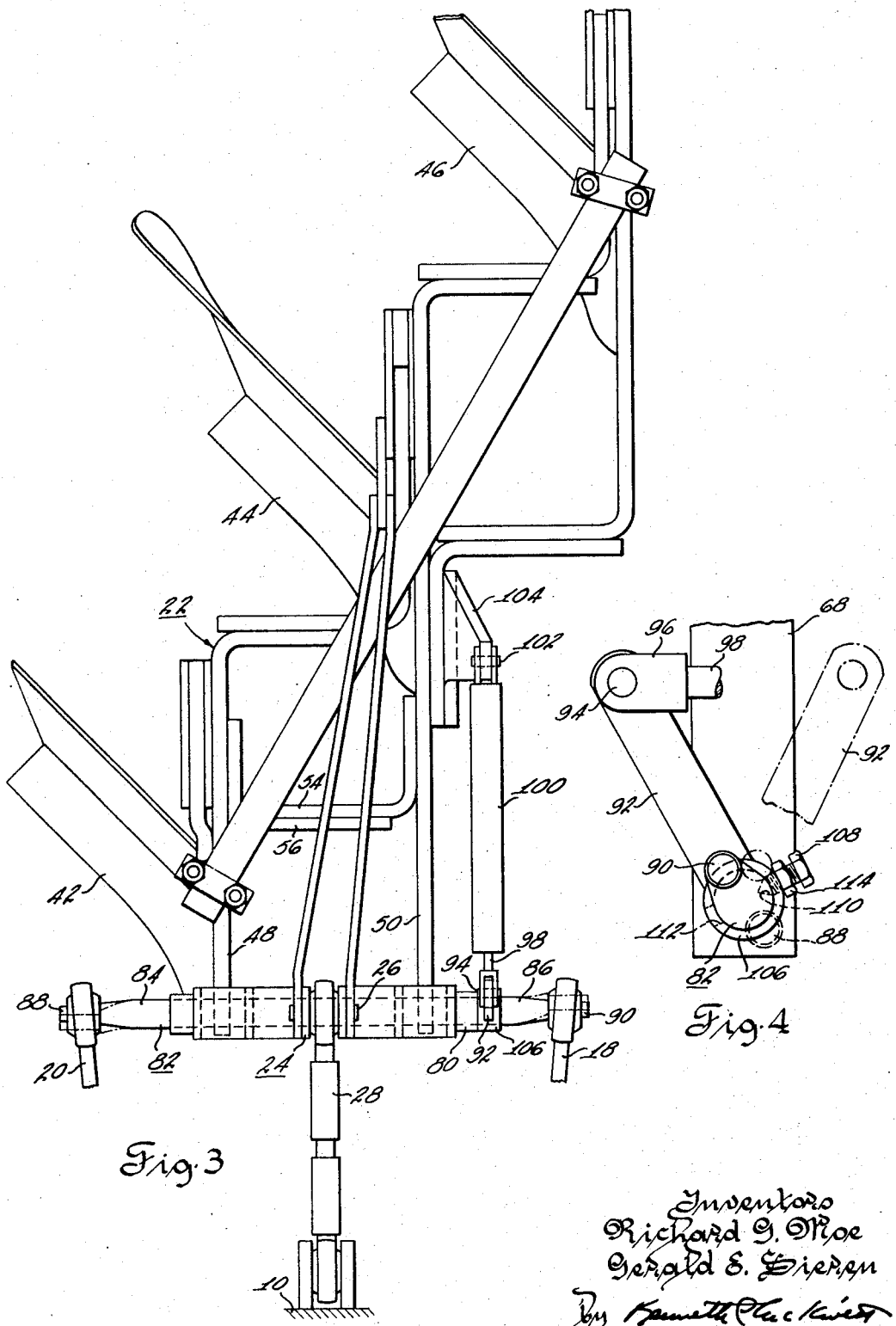

3,454,105
PLOW HITCH
Richard G. Moe, New Berlin, and Gerald E. Sieren, Milwaukee, Wis., assignors to Allis-Chalmers Manufacturing Company, Milwaukee, Wis.
Filed Sept. 26, 1966, Ser. No. 582,052
Int. Cl. A01b 59/06, 59/043, 63/02
U.S. Cl. 172—446                  5 Claims

ABSTRACT OF THE DISCLOSURE

Structure in a tractor mounted plow for providing an adjustment of the plow relative to the tractor to compensate for the plow's tendency to move down a side hill. This adjustment is of a two-fold type; to take care of an accentuated tendency to move down hill or to take care of minor tendencies.

---

This invention relates to a plow hitch and particularly to such a hitch which is especially adapted for use on a hillside, and an object of the invention is to generally improve plow hitches of this class.

As is well known, the usual plow cuts a furrow of a uniform depth, making a vertical cut in the earth and peeling off a slice which it throws to the right; and the width or the thickness of this slice depends upon the horizontal angle between the plow and its carrying structure and the tractor which is pulling the plow. Thus, if the plow is angled slightly toward the left, for example, it will cut a wider or thicker slice than if it is angled slightly toward the right or than if it is trailed exactly parallel to the tractor path. When the outfit is operated on a sloping surface such as side hill, there is a tendency for the tractor to skid slightly down the hill, which is corrected by the tractor operator by yawing the tractor slightly up the hill. The same effect is present in the plow. In other words, the plow also tends to drift down the hill; and as stated, this will cause the plow to cut a narrower slice than desired. In similar manner this can be corrected by yawing the plow up the hill, which is accomplished by altering the angle slightly between the tractor and the plow. Since the angle of the side hill and correspondingly the angle of the plow necessary to compensate for the drift may cary quite rapidly from one part of a field to another, it is convenient to have the angle adjustable by remote control from the tractor operator's position. Such remote control of the angle may be quite limited in amount and, therefore, not adapted to relatively large changes in angle such as would be necessary if it were decided to alter the thickness of the slice for certain conditions. It is accordingly an object of the invention to provide for adjustment of the thickness of the furrow slice in a structure which also provides remote control of the slice for correcting deviation in side hill operation.

Another object is to provide for extreme changes in angle under appropriate conditions, and a further object is to provide such a structure which can be assembled so as to prodive plows of different overall widths.

Other objects and advantages will become apparent from the following specification and the annexed drawings in which:

FIG. 1 is a side elevation of so much of a tractor and attached plow as necessary to illustrate the invention;

FIG. 2 is a front view of a portion of the plow alone taken substantially on the line II—II of FIG. 1;

FIG. 3 is a plan view of the structure of FIG. 1;

FIG. 4 is an enlarged detail of certain mechanism indicated in FIG. 1; and,

FIG. 5 is a view similar to FIG. 4, but showing a modified arrangement.

Referring particularly to FIG. 1, the hitch embodying the invention is carried on a tractor having a body portion 10 supported on traction wheels 12 and 14 and which has secured thereto on pivots such as 16 reawardly directed draft arms 18 and 20. Arms 18 and 20 are attached to and pull a plow frame generally designated as 22 and which has an upstanding mast portion 24. Mast 24 is connected through a pivot 26 with a link 28 extending forwardly and pivoted on a pin 30 to tractor body 10 at a point considerably above and between draft arms 18 and 20. Draft arms 18 and 20 are pivoted to plow frame 22 and as will be described, the arrangement being known in the trade as a three-point hitch and which gives a modified up-and-down swinging movement of plow frame 22 in relation to tractor. 10.

Commonly the plow will seek a depth wherein the angle of pull or other force in arms 18 and 20 and link 28 will equal the backward resistance of the plow plus the weight of the plow plus the tendency of the plow to "suck" or dig deeper into the soil. Draft arm 18 is connected through a link 32 with a lift arm 34 pivoted on the tractor at 36, arm 34 being swung upwardly by power from a motor of suitable type 38. A similar link 40 and connected mechanism is supplied on the other side of the tractor for draft arm 20. By actuation of motor 38, draft arms 18 and 20 can be swung about their pivots so that the entire plow can be lifted out of the ground, and it is known to position the plow bottoms 42, 44 and 46 so that they will tend to plow deeper than desired and then to counteract this by a continuous upwardly lifting force exerted by motor 38, thereby adding a desirable amount of downward pressure to traction wheels 12 and 14.

Frame 22 comprises beam elements 48 and 50 (see also FIG. 3), which extend backwardly and carry plow standards as 52 and which are connected by braces as 54 and 56. Beams 48 and 50 are carried on bolts 58 and 60 extending respectively through legs 62 and 64, and 66 and 68, forming a part of mast structure 24. Spacers 70 and 72 on bolt 58 determine the lateral position of beam 48 between legs 62 and 64, and the latter parts may be assembled in various ways, as is well known, to position beam 48 in any one of three different positions between legs 62 and 64. In similar manner, spacers 74 and 76 are positioned on bolt 60 and for similar reasons. Also in well known manner, braces 54 and 56 may be assembled to result in different spacings between beams 48 and 50. Thus, it is possible to assemble the parts so that plow frame 22 is displaced somewhat to the right or left of the position shown and also to provide for a wider or narrower frame, resulting in different spacing of bottoms 42, 44 and 46.

Legs 62 and 68 have bushing or bearing portions 78 and 80 in which is journaled a cross member or rock shaft 82, legs 64 and 66 having suitable openings through which rock shaft 82 also passes Rock shaft 82 constitutes the major member for transmitting the pull of tractor 10 to plow frame 22 and has a downwardly cranked portion 84 at the left and an upwardly cranked portion 86 at the right in FIG. 2, although on the left side of the plow as related to the direction of progress. Portion 84 has a journal 88 on which, the plow is assembled with a tractor, is pivoted above mentioned draft arm 20. In similar manner, portion 86 has a journal 90 on which is pivoted draft arm 18 as best seen in FIG. 3. In the position of the parts shown in FIG. 3, which might for reference be termed normal, rock shaft 82 is disposed substantially at right angles to the median plane of tractor 10; and all adjustments would be made so that the plow would run straight and cut the desired width of furrow in this adjustment of rock shaft 82. This relation, however, may be altered in order to correct a tendency of the plow to drift down hill in hillside operations, for this purpose an adjusting lever or arm 92 being provided.

Arm 92 is fixed on rock shaft 82 and extends generally upwardly to a pivot pin 94. Pin 94 is engaged with arm 92 and with a clevis 96 fixed on a piston rod portion 98 of a fluid motor 100. Motor 100 is pivoted on a pin 102 to a bracket 104 fixed on beam 50 or any suitable rugged portion of frame 22. Actuation of motor 100 by suitable well known control means, not shown, will cause rocking of rock shaft 82. By reason of the upwardly cranked portion 86, counterclockwise rocking as seen in FIG. 1 will cause rearward movement of the left hand end of rock shaft 82 (right end as seen in FIG. 3). Conversely, such rocking will cause forward movement of portion 84 and counterclockwise angling of rock shaft 82 and plow frame 22 as seen in FIG. 3.

As is well known, it is sometimes necessary in working on a hillside to throw the furrow down the hill, which would be to the right as compared to the direction of movement or to the left in FIG. 3 and the tendency of the plow to drift down the hill would be toward the left in FIG. 3. The direction in which rock shaft 82 and frame 22 is angled by the above described rocking of rock shaft 82, as will be clear, is to head plow frame 22 up the hill or in the direction to tend to counteract the tendency to drift. The operator, through the use of his controls, may actuate motor 100 as often as desired to increase or decrease the angle of frame 22 in order to correct the varying tendency to drift as the hillside plowing continues so that a substantially uniform furrow slice may be cut whether the plow is running on a slight hillside, an extreme hillside, or on the level. Furthermore, the width of the furrow slice may be adjusted in this manner even when running on the level.

Different crops and different soil and other conditions dictate largely different widths of furrow slice, and often it will not be practical to obtain sufficient adjustment within the range of movement of piston rod 98, and this difficulty is overcome by a novel method of fastening arm 92 to rock shaft 82.

Arm 92 has a sleeve portion 106, which would be rotatable on rock shaft 82 except for the action of a set screw 108 threaded into sleeve 106 and seated in a suitable depression in rock shaft 82. Set screw 108 is located in a plane parallel to rock shaft 82 and disposed at somewhat less than a right angle to the median plane of arm 92 parallel to rock shaft 82. Sleeve 106 has an extra hole 112 in the present instance axially in alignment with set screw 108 and which is adapted to receive the latter when it is desired to alter the range of angular adjustment of frame 22 in response to the action of motor 100.

It will be apparent that it is possible with the construction so far described to alter the angle of frame 22 so as to change the thickness of the furrow slice to a limited extent either side of what it would be with a predetermined adjustment of all of the parts merely by actuating motor 100. Such adjustment may not be sufficient for the conditions encountered, and the range may be altered by a simple reassembly operation as follows:

Draft arm 18 is removed, as also are pin 94 and set screw 108. Arm 92 is then slid off of rock shaft 82 and turned over or reversed and replaced with the other side out. Set screw 108 is then placed in hole 112, which is now located on the other side of rock shaft 82, and seated in recess 110. Arm 92 will now be located at a different angle to rock shaft 82 and cranked portions 84 and 86 so that, when the parts are reassembled, plow frame 22 will stand at a different angle to the tractor for a given position of piston rod 98 than it did before.

Set screw 108 preferably has a lock nut 114, which bears against sleeve 106 to aid in preventing set screw 108 from working loose.

As seen in FIG. 2, recess 110 is elongated to provide for location of sleeve 106 along rock shaft 82 in various places as may be required by adjustment of the width of frame 22 or relocation of beam 50.

The same basic arrangement for angling plow frame 22 may be supplied for hand operation, the identical parts, leg 68, rock shaft 82, journal 90, and adjusting arm 92, including set screw 108, being used as seen in FIG. 5. A quadrant 116 is fixed in any suitable manner on leg 68, and a hand lever 118 has a sleeve portion 120 journaled on rock shaft 82 between abovementioned sleeve 106 and leg 68. Lever 118 is clamped against adjusting lever 92 by means of a U-bolt or the like 122, one side of which extends through a suitable aperture in adjusting lever 92. A strap 124 extends across the face of lever 118 between it and adjusting lever 92. U-bolt 122 has nuts 126 and 128 and with these removed, U-bolt 122 may be assembled with levers 118 and 92 and with strap 124 so that lever 118 is on the other side of adjusting lever 92 as indicated by broken lines in FIG. 5. In this way a large change in the position of rock shaft 82 may be accomplished for any given position of lever 118. Also a further change in the relation of lever 118 to rock shaft 82 may be accomplished by reversing adjusting lever 92 as hereinbefore described and reassembling the parts otherwise in the same relation as shown in FIG. 5.

Any suitable latch arrangement 130 may be provided to cooperate with the notches 132 in quadrant 116 to maintain the parts in desired positions.

The operation of the device is thought to be clear from the above but it is pointed out that, as tractor 10 proceeds, plow bottom 42 will enter the ground and descend by virtue of swinging of arms 18 and 20 and link 28 to a depth where the forces involved will come into equilibrium. If now the tractor and plow encounter a sloping surface or side hill and the plow tends to drift down the hill, the operator may, by actuating the usual controls, extend piston rod 98, thereby rocking rock shaft 82 and angling the plow uphill to whatever extent is necessary to correct the downward drift. As soon as level ground is again encountered, the operation may be reversed, and the plow may be promptly and conveniently put back into position to run straight. In the structure disclosed, extending of piston rod 98 will cause the plow to take a thicker slice, whereas retracting of piston rod 98 will cause it to take a thinner slice. If a thicker slice is desired, it may be that piston rod 98 cannot be extended sufficiently to obtain as thick a slice as desired. In this case adjusting lever 92 may be removed as hereinbefore described and replaced in a reversed or inside-out position, whereupon rock shaft 82 will be held in a different angular relation to adjusting arm 92 when the parts are replaced, and set screw 108 is in position in hole 112 and recess 110. The furrow slice may then again be adjusted either way from a new basic thickness by manipulation of motor 100.

Where motor 100 is not desired or for use with a tractor which is not equipped to supply fluid pressure, hand lever 118 and its attached parts may be supplied in lieu of motor 100. With this arrangement the width of the furrow slice may be adjusted by releasing latch 130 and swinging lever 118 in the appropriate direction, which will cause the plow to deviate from a basic selected furrow width. If such furrow width is not that desired, adjusting lever 92 may be reversed as described, which will change the relation of rock shaft 82 and result in adjustment of the furrow width through lever 118 either side of a new furrow width. If a still further change in furrow width is desired, lever 118 may be assembled on the other side of adjusting lever 92, which will result in a still greater change in the basic furrow width from which minor deviations may be effected by adjustment of lever 118.

The embodiments of the invention in which an exclusive property or privilege is claimed are defined as follows:

1. A hillside plow hitch for use with a tractor of the type having a pair of laterally spaced rearwardly directed lower draft arms comprising the combination of a plow frame, a transversely disposed rock shaft on the frame, and having oppositely offset end portions, each engaged with one of said rearwardly directed draft arms and an adjusting arm angularly reversibly fixed on said rock shaft, and when in one position, providing a predetermined angular relation to said offset portions, means for rocking said adjusting arm whereby to rock said rock shaft and produce a change in the angular relation between said plow frame and said tractor for correcting deviations from the desired width of furrow slice and means for fixing said adjusting arm on said rock shaft in a reversed position to provide a different angular relation to said offset portions whereby to effect a different change in the angular relation between said plow and said tractor for achieving a desired different width of furrow slice.

2. A plow hitch having all the characteristics of claim 1 in which said adjusting arm is reversible in position and said means for fixing said adjusting arm on said rock shaft will act to also secure said adjusting arm to said rock shaft in its reversed position and in said different angular relation to said offset portions.

3. A plow hitch having all the charatceristics of claim 1 in which said means for rocking said adjusting arm comprises an expansible fluid motor having one end anchored on said plow frame and the other pivotally connected to said adjusting arm at a point spaced from said rock shaft.

4. A plow hitch having all the characteristics of claim 2 in which said means for rocking said adjusting arm comprises an expansible fluid motor having one end anchored on said plow frame and the other end pivotally connected to said adjusting arm at a point spaced from said rock shaft.

5. A plow hitch having all the characteristics of claim 2 in which said means for fixing said adjusting arm on said rock shaft comprises a recess in said shaft, a sleeve on said arm disposed about said shaft, peripherally spaced openings in said sleeve, and means engaged on one of said openings and in said recess defining a predetermined angular relation between said rock shaft and said adjusting arm, and one of said openings being peripherally spaced about said sleeve from said arm a larger amount than another, whereby when said arm is reversed and said means is engaged in another opening, said arm will be fixed in a different angular relation on said rock shaft.

References Cited

UNITED STATES PATENTS

| 2,775,178 | 12/1956 | Chambers et al. | 172—446 X |
| 1,220,449 | 3/1917 | Patterson | 172—482 |
| 1,916,945 | 4/1933 | Ferguson | 172—446 X |

ANTONIO F. GUIDA, *Primary Examiner.*

STEPHEN C. PELLEGRINO, *Assistant Examiner.*